May 3, 1966   J. V. MILLER   3,249,760
PRESSURE GAUGE INSTRUMENT
Filed Feb. 11, 1963

JACK V. MILLER
INVENTOR.

BY Allen E. Botney

ATTORNEY

_United States Patent Office_

3,249,760
Patented May 3, 1966

1

3,249,760
PRESSURE GAUGE INSTRUMENT
Jack V. Miller, Azusa, Calif., assignor to Electro-Optical Systems, Inc.
Filed Feb. 11, 1963, Ser. No. 257,557
7 Claims. (Cl. 250—231)

The present invention relates in general to pressure gauge devises and more particularly relates to a bellows type of pressure gauge that is based on electro-optical principles.

Roughly speaking, stagnation pressure may be defined as the pressure exerted by a fluid as a result of a vehicle moving through it. Conventional methods of measuring stagnation pressure and static pressure usually involve the use of a bellows, along with an electromechanical pickoff, such as a potentiometer. Thus, in these prior art pressure gauge devices, the bellows is connected to the potentiometer resistive element as the bellows expands and contracts in response to pressure variations. It will be apparent that the sliding contact between the wiper and resistive elements of the potentiometer results in the introduction of frictional forces which have the effect of reducing the sensitivity of the instrument to small changes in pressure and of destroying its effectiveness at very high altitudes where the earth's atmosphere is rarified and, therefore, where the pressures are extremely small. Accordingly, lack of sensitivity has been an inherent disadvantage of earlier types of pressure gauge devices, with the result that there has been a long-felt need for an improved pressure gauge instrument.

The present invention is based on an electro-optical technique as well as a different kind of bellows movement, the two together helping to eliminate the deleterious effects of friction normally encountered. More particularly, in an instrument incorporating the friction-reducing techniques of the present invention, a taut band pivot suspension is tied to one edge of the free end of the bellows, the taut band suspension causing the bellows and plate to rotate about the center of suspension instead of merely extending in a linear fashion as before. The bellows end plate has a mirrored reflective surface that permits the reflectance of a focused light spot onto a photoelectric pickoff, such as a single axis radiation tracking transducer. Any change of pressure within the bellows results in a change of the angle of the mirror which, in turn, results in a total angular change in the direction of the light beam equal to twice the angular change of the mirror. The amplitude and the polarity of the voltage generated by the optical detector or photoelectric pickoff device corresponds to and is, therefore, a measure of this angular change. Consequently, the signal is also a measure of the pressure being exerted. Since an embodiment of the present invention would not include relative motion between contacting surfaces, friction is not a serious problem and, therefore, pressure measurements can be made with greatly increased accuracy.

It is, therefore, an object of the present invention to provide a pressure gauge instrument whose instruments are not affected by frictional forces.

It is another object of the present invention to provide a pressure gauge instrument having a degree of sensitivity not heretofore possible.

The novel features which are believed to be character-

2 istic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 1:
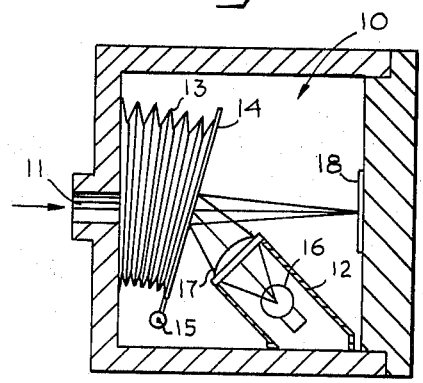
FIGURE 1 illustrates an embodiment of the present invention adapted for the measurement of absolute pressures.

Referring now to the drawings, reference is made to FIG. 1 wherein the embodiment therein is shown to include a sealed chamber 10 having an opening 11 through one wall thereof. Mounted within sealed chamber 10 is a light source structure 12, a bellows 13, and an optical detector in the nature of a photoelectric pickoff device that is designated 18. Bellows 13 is mounted over opening 11 in such a manner that opening 11 is aligned with the aperture leading into the bellows. In this way, air or any other fluid entering hole 11 will also gain entrance to the bellows. The free end of the bellows, that is, the bellows end plate has a mirrored reflective surface that permits the reflectance of a focused spot of light onto the above-said photoelectric pickoff, as will be explained in greater detail below. In addition a taut band pivot or torsion bar suspension 15 is tied to one edge of the bellows end plate, the bottom edge shown in the figure, the bellows end plate rotating about this pivot or torsion bar in response to pressure instead of merely extending itself in a linear fashion. Optical detector 18 is mounted on the wall opposite bellows 13, with the result that the optical detector faces mirror 14. Optical detector 18 is a single axis photoelectric pickoff device, preferably a single axis radiation tracking transducer which is a semiconductor device that generates a voltage whose amplitude and polarity vary as a spot of light is moved along the straight line between its two output terminals. A detailed description of a radiation tracking transducer of the kind that can be used herein may be found on pages 336–341 of an article entitled, "Radiation Tracking Transducer," by D. Allen, I. Weiman, and J. Winslow, in the periodical entitled, I.R.E. Transactions on Instrumentation, published in December 1960. With respect to light-source structure 12, it includes a source of light 16 and a lens combination 17 arranged to converge the light emanating from source 16. Light-source structure 12 and its component parts is mounted in chamber 10 so that the light beam out of lens 17 will be incident upon mirror 14 and reflected therefrom to radiation tracking transducer 18. For this reason, structure 12 is rigidly mounted in the lower right-hand corner of chamber 10, as is shown in the figure.

In considering the operation, it should be mentioned first that the light beam reflected from mirror 14 converges to a point or tiny spot of light on the surface of radiation tracking transducer 14 and, furthermore, that when bellows 13 is in its neutral position, as it is in FIG. 1, the above said spot of light will impinge upon the center or zero point of the transducer axis, with the result that no output voltage is developed by the transducer. It should also be mentioned that chamber 10 is maintained at a fixed or constant pressure and by so doing absolute pressures may be measured. Accordingly, with these facts in mind, a change of pressure within bellows 13 results in a change of the angle of mirror 14 which, in turn, results in an angular change in the direction of the light beam equal to twice the angular change of the mirror. These angular changes of mirror 14 cause the spot of light to move to different axial positions on the surface of transducer 18, the amplitude and polarity of the voltage generated by the transducer thereby constituting a measure of the pressures being exerted against the instrument. Although not shown in the figure since it was not deemed pertinent to the invention, the output from transducer 18 is fed to electronic circuitry wherein it is amplified and thereafter either used for control purposes or telemetered to the surface of the earth.

It should be noted that a characteristic of the radiation tracking transducer is that it has greatly increased accuracy and sensitivity near its null position. Consequently, it becomes possible to calibrate these pressure gauges for maximum sensitivity in a specific altitude range of interest. It follows then that a series of such absolute pressure gauges having adjacent sensitivity peaks could be made to overlap in such a manner as to provide accurate absolute pressure information over an extremely wide range of altitudes and stagnation pressures. A straightforward electronic system could automatically switch the telemetry information channel to the transducer or transducers having the highest output level.

Figure 2:
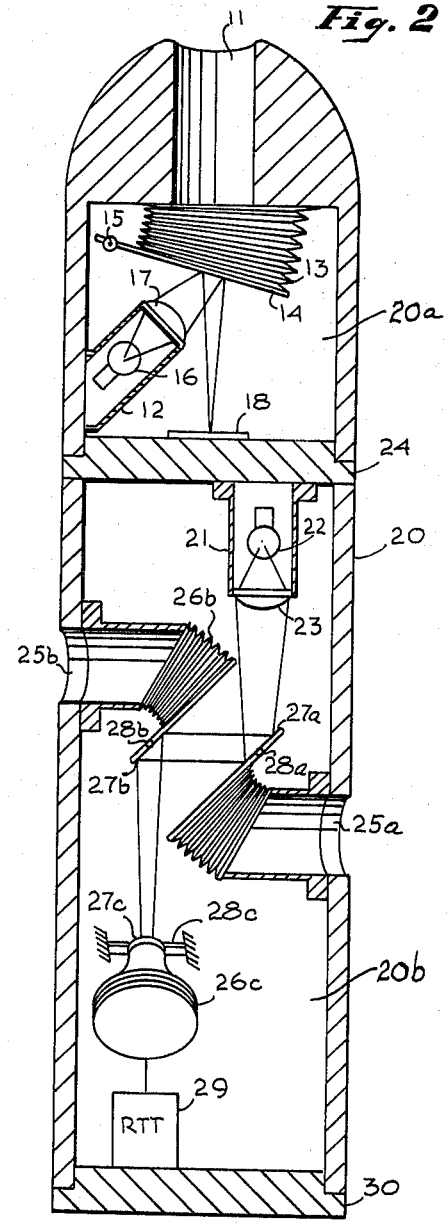
FIGURE 2 illustrates the embodiment of FIG. 1 adapted for the measurement of both absolute and relative pressures.

As distinguished from the absolute pressure gauge, a relative pressure gauge incorporating the principles of the present invention involves merely an extension of the same technique in which the sealed chamber is vented to the comparison pressure. An interesting application of the present invention, both as to the absolute pressure gauge, as well as the relative pressure gauge is shown in FIG. 2 to which reference is now made. The instrument shown therein would normally be mounted in the front part of any fast-moving vehicle and for this reason it has a bullet-shaped housing 20 in which are provided chambers 20a and 20b, chamber 20a being a sealed chamber of the kind previously described in connection with FIG. 1 and chamber 20b being a chamber vented to the ambient atmosphere or environment by means of openings or ports through the housing. Sealed chamber 20a contains within it the identical pressure gauge shown in FIG. 1 and, therefore, its elements are identically designated. Furthermore, since the construction and operation of the absolute pressure gauge in FIG. 2 is identical in every respect with the gauge shown in FIG. 1, for sake of expediency and to avoid being redundant, it is not deemed necessary to provide any further description of it. Suffice it to say, therefore, that the description applied to the meter shown in FIG. 1 is equally applicable to the meter found in chamber 20a in FIG. 2.

In chamber 20b, on the other hand, four relative pressure gauges are combined, a single light source structure 21 being provided for all of them. As before, the light source structure includes a source of light 22 and a lens combination 23 arranged to converge the light emanating from the source. As shown in the figure, structure 21, together with its component parts, is mounted on wall 24 separating chambers 20a and 20b, but it should be understood that this is not an absolutely necessary location for the structure. As previously mentioned, chamber 20b is vented to the outside atmosphere or environment and for this purpose housing 20 has four openings or ports through its wall, designated 25a–25d, the openings being spaced every 90 degrees around the housing. Thus, there are two pairs of openings, one pair being angularly displaced from the other pair by 90 degrees and the openings within a pair being separated from each other by 180 degrees. Since FIG. 2 presents a cross-sectional view, only one pair of such openings are shown, namely, openings 25a and 25b.

Respectively mounted over these four ports are four bellows designated 26a-26d, each bellows being mounted over its associated port in such a manner that the port is aligned with the aperture leading into the bellows. In this way, as was previously mentioned, air or any other fluid entering a port will also gain entrance to the associated bellows. Again, because of the fact that a cross-sectional view of the instrument is taken, only three of the four bellows are shown in the figure, namely, bellows 26a-26c. As before, the free end plate of each of the four bellows has a mirrored reflective surface that permits the reflectance of a focused spot of light, a flexure pivot that may be a taut band pivot or torsion bar suspension being rigidly fastened to the bellows at the edge of its end plate. The mirrors and their flexure pivots are respectively designated 27a–27d and 28a–28d and, as may be expected, each bellows end plate and, therefore, each mirror thereon rotates about its torsion bar suspension or taut band pivot in response to pressure instead of merely extending itself in a linear fashion. It will be recognized that each torsion bar suspension or taut band pivot is rigidly mounted on housing structure 20 as is illustrated in connection with torsion bar 28c.

Finally, the relative pressure gauge arrangement in chamber 20b also includes an optical detector 29 mounted on the near wall of housing structure 20, that is to say, on wall 30 facing wall 24. Here again, however, the mounting of the optical detector on wall 30 is not a necessary requirement. As heretofore mentioned, optical detector 29 is preferably a radiation tracking transducer whose output terminals are connected to standard electronic circuitry for amplification and utilization. For sake of convenience, the radiation-tracking transducer represented by element 29 in FIGS. 2 and 3 has been marked with the legend RTT which, it will be understood, is nothing more than an abbreviation of the words "radiation-tracking transducer."

Figure 3:
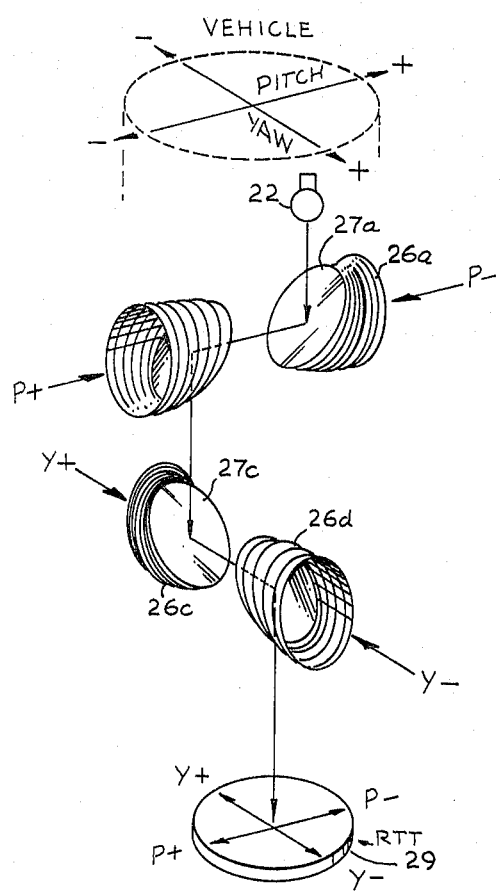
FIGURE 3 is a sketch in perspective of a portion of the FIG. 2 structure for the purpose of more clearly illustrating its arrangement and operating principles.

In considering the operation, it is deemed worthwhile to first refer to FIG. 3 wherein are presented the outlines of the pressure gauge apparatus in chamber 20b for the purpose of illustrating the operating principles behind or underlying this apparatus. Accordingly, the yaw and pitch axes of an imaginary vehicle as well as the yaw and pitch axes on the surface of radiation tracking transducer 29 are clearly shown. Depicted between the imaginary vehicle and the transducer are the four bellows 26a–26d and the four mirrors 27a–27d thereon. As is clearly shown, a narrow converging light beam is projected against mirror 27a, and from mirror 27a the light beam is successively reflected to and from mirrors 27b, 27c and 27d. From mirror 27d it is reflected onto the surface of transducer 29. As may be seen from the figure, bellows 26a and 26b are suitably oriented with respect to each other along the pitch axis whereas bellows 26c and 26d are suitably oriented with respect to each other along the yaw axis. When the bellows aforesaid are in their normal or neutral positions, the light beam is reflected from them to the center of the yaw and pitch axes on the surface of transducer 29. However, the spot of light will be reflected to different coordinate positions on the transducer as the bellows and their respective mirrors become angularly displaced in response to the different wind or other fluid pressures exerted against them, the yaw and pitch coordinate values of the spot of light corresponding to the direction and magnitude of the pressures experienced.

With this basic information in mind, reference is made once again to chamber 20b in FIG. 2 wherein the converging beam of light passing through lens 23, after the four reflections, falls on radiation tracking transducer 29. Any slight increase in pressure at port or opening 25a causes the focused spot of light on the radiation tracking transducer to move in one direction, a reduction in pressure in port or opening 25b causing the spot of light to move in that same direction. However, a shift in the local wind, which will cause an increase in pressure in port or opening 25b and a decrease in pressure in port or opening 25a, will cause the focused spot of light to shift or move in the reverse direction on the radiation tracking transducer. The other two pressure ports, namely, ports 25c and 25d, which are oriented at 90 degrees to ports 25a and 25b, affect the light beam in a similar fashion so that, with respect to them, the spot of light moves in a path that is 90 degrees to the first path abovesaid. With this arrangement, differential pressures may be read in $xy$ coordinates directly from the radiation tracking transducer, the magnitude of a pressure difference being read as output amplitude. Of course, the greatest sensitivity exists about the null point.

Although a particular arrangement of the invention has been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. An absolute pressure gauge comprising: a hollow housing structure having a single opening through a wall thereof through which ambient atmospheric pressures are exerted; a bellows mounted between end plates mounted within the hollow of said structure on the wall thereof having said opening, said bellows having an aperture through one of said end plates and being mounted in such a manner that said aperture is coextensively aligned with said opening; a flexure pivot rigidly joined to the other of said end plates at one end thereof, said bellows being operable to rotate around said pivot from a null position in response to ambient atmospheric pressures exerted internally against it; and optical apparatus mounted within said structure and on said bellows for providing a measure of the displacement of said bellows from its null position, said apparatus including an optical detector fixedly mounted at one point inside said structure and means fixedly mounted at another point inside said structure for projecting a spot of light onto said optical detector whose position on said optical detector corresponds to the displacement of said bellows.

2. An absolute pressure gauge comprising: a hollow housing structure having a single opening through a wall thereof through which ambient atmospheric pressures are exerted; a bellows mounted between end plates mounted within said structure in such a manner that one of said end plates covers said opening, said one end plate having an aperture therethrough that is coextensively aligned with said opening; a taut band pivot rigidly fixed to said structure and to the other of said end plates at one end thereof, said bellows rotating around said pivot from a null position in response to atmospheric pressure variations exerted internally against it; a mirror mounted on the free end plate of said bellows; and optical apparatus mounted within said structure for providing a measure of the displacement of said bellows from its null position, said apparatus including means fixedly mounted inside said structure for projecting a converging beam of light against said mirror, and an optical detector that produces a voltage whose amplitude and polarity correspond to the position of a spot of light incident thereon, said optical detector being fixedly positioned to receive the beam of light reflected from said mirror as a spot of light.

3. The pressure gauge defined in claim 2 wherein said optical detector is a radiation tracking transducer.

4. An absolute pressure gauge comprising: a hollow housing structure having a single opening through a wall thereof through which ambient atmospheric pressures are exerted; a bellows mounted between end plates mounted within said structure in such a manner that one of said end plates covers said opening, said one end plate having an aperture therethrough that is coextensively aligned with said opening; a flexure pivot rigidly fixed to said structure and to the other of said end plates at one end thereof, said bellows being operable to rotate around said pivot from a null position in response to atmospheric pressure variations exerted internally against it; a mirror mounted on the face of the other end plate of said bellows; an optical detector that produces a voltage whose amplitude and polarity correspond to the position of a spot of light incident thereon, said optical detector being fixedly mounted to permanently face and be exposed to said mirror; and a light source and lens arrangement for projecting a converging beam of light toward said mirror, said source and lens arrangement being adapted such that the beam of light reflected from said mirror converges to a spot of light on said optical detector.

5. A pressure gauge instrument comprising: a housing structure having first and second chambers, said first chamber having a single port through which ambient atmospheric pressures are exerted and said second chamber having four ports spaced 90° apart from each other along the periphery of said structure through which ambient atmospheric pressures are exerted, said first and second chambers respectively housing absolute and relative pressure gauges, said absolute pressure gauge including a bellows having an aperture therethrough at one end mounted over said single port with the bellows aperture mounted over and in alignment with said single port, a flexure pivot rigidly fastened to the other end of said bellows at one edge thereof, said bellows being operable to rotate around said pivot from a null position in response to atmospheric pressures exerted internally against it, and a first optical apparatus coupled to said bellows for providing a measure of the displacement of said bellows from its null position, said first apparatus including a first optical detector and first means for projecting a spot of light onto said first optical detector whose position on said optical detector corresponds to the displacement of said bellows, and said relative pressure gauge including four bellows respectively mounted over said four ports, each of said four bellows having an aperture therethrough at one end thereof that is mounted over and in alignment with its associated port, four flexure pivots rigidly fastened to the other ends of said four bellows, respectively, at an edge thereof, each of said four bellows being operable to rotate around its pivot from a null position in response to atmospheric pressures exerted internally thereagainst, and second optical apparatus coupled to said four bellows for providing a measure of the displacement of any one of them from its null position, said second apparatus including a second optical detector and second means for projecting a spot of light onto said second optical detector whose position thereon corresponds to the displacements of said bellows.

6. The instrument defined in claim 5 wherein said first optical detector is a single axis radiation tracking transducer and said second optical detector is a two axis radiation tracking transducer.

7. The instrument defined in claim 5 wherein the first optical apparatus of said absolute pressure gauge includes a first mirror mounted on the face of the other end of said single bellows, and a first light source for projecting a converging beam of light onto said first mirror for reflection therefrom to said first optical detector, said first optical detector being of the kind that produces a voltage whose amplitude and polarity corresponds to the displacement of said single bellows, and wherein the second optical apparatus of said relative pressure gauge includes four mirrors respectively mounted on the faces of the other ends of said four bellows, and a second light source for projecting a converging light beam toward said four mirrors for successive reflection therefrom to said second optical detector, said second optical detector being of the kind that produces a voltage whose amplitude and polarity corresponds to the displacements of said four bellows.

References Cited by the Examiner

UNITED STATES PATENTS

| | | | |
|---|---|---|---|
| 2,067,262 | 1/1937 | Demontvignier et al. | 250—231 X |
| 2,420,159 | 5/1947 | Wineman | 250—231 X |
| 2,449,953 | 9/1948 | Rippingille | 250—231 X |
| 2,666,650 | 1/1954 | MacDonell | 250—231 X |
| 3,038,079 | 6/1962 | Mueller | 250—203 |
| 3,093,741 | 6/1963 | Meyer | 250—218 X |
| 3,121,795 | 2/1964 | Marvin | 250—231 X |
| 3,159,750 | 12/1964 | Kazan | 250—231 |

RALPH G. NILSON, *Primary Examiner.*

WALTER STOLWEIN, *Examiner.*